July 1, 1958     D. H. ZIPPER     2,841,304
CLOSURE CAP FOR GLASS CONTAINERS
Filed July 8, 1955
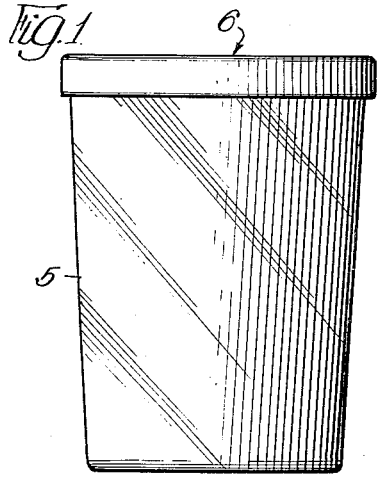
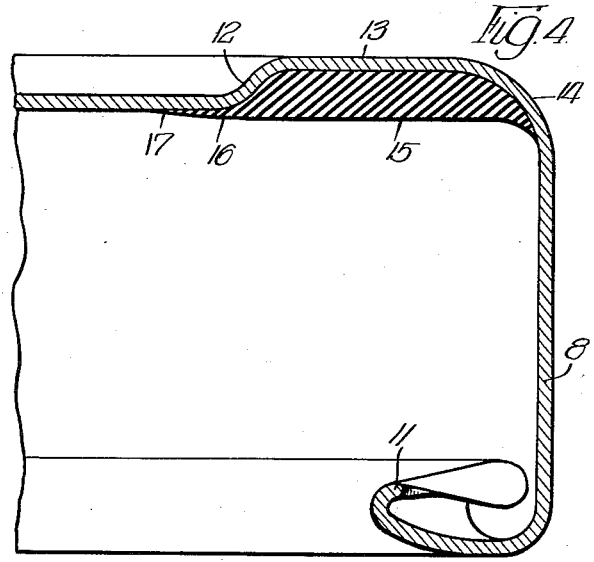
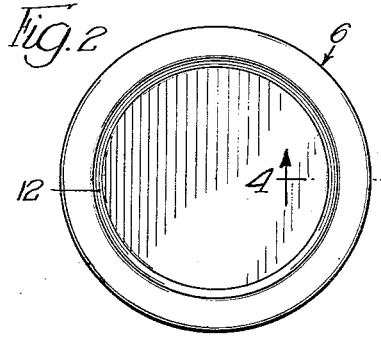
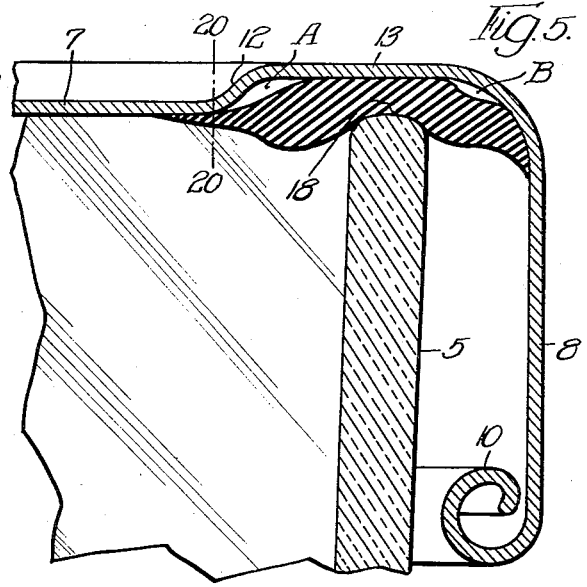
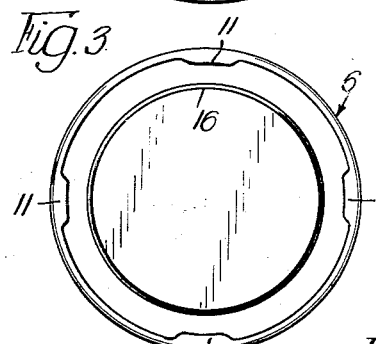
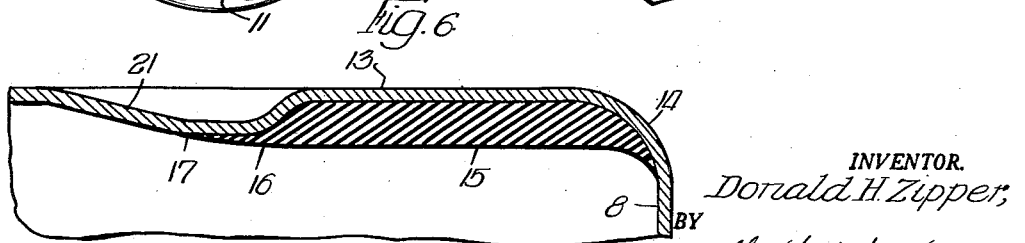
INVENTOR.
Donald H. Zipper,
BY
Cromwell, Greist & Warden
Attys.

United States Patent Office 2,841,304
Patented July 1, 1958

2,841,304

CLOSURE CAP FOR GLASS CONTAINERS

Donald H. Zipper, Elmhurst, Ill., assignor to White Cap Company, Chicago, Ill., a corporation of Delaware Application July 8, 1955, Serial No. 520,881

3 Claims. (Cl. 215—40)

This invention relates to improvements and innovations in closure caps for hermetically sealing glass containers. More particularly, the invention pertains to such closure caps which comprise a cap shell or body formed of thin metal stock having a top seal gasket of the flowed-in type and formed from a so-called "plastisol" type resin paste which is flowed into place and then fluxed.

The term "plastisols" designates resin base pastes comprising a dispersion of finely powdered polyvinyl chloride or copolymers of vinylidene chloride, polyvinylacetate and acrylonitrile in a plasticizer vehicle. Various fillers and adjunct materials may also be present in the formulations. These formulations do not contain volatile solvent and may be formulated with such viscosity that they may be squirted out of nozzles into the bodies of closure caps of the class described. Such deposits will remain in position during the handling required in manufacture and upon heating sufficiently the plasticizer diffuses throughout the resin particles so as to transform the plastisol from a pasty mixture to a permanent rubber-like gasket. This transformation is usually referred to as "fluxing." A discussion of plastisol formulations of the type referred to is contained on pages 350 and 351 of the text, The Chemistry of Commercial Plastics, by Wakeman, Rheinhold Publishing Corporation, 1947.

The formulation of plastisols for various purposes, including flowed-in gaskets has become well developed within the past few years and such materials are commercially available from several manufacturers or may be readily formulated from commercially available ingredients. The present invention is not concerned with specific plastisol formulations but is directed to certain novel features of closure cap design wherein a plastisol is used as the gasket-forming material and after being flowed into place is fluxed by known means and technique.

The general type of closure cap to which the present invention pertains has a metal cap body or shell having a top panel portion and a depending skirt portion. An annular gasket formed from a suitable plastisol is located in and around the outer margin of the top panel so that when the cap is forced down onto the top of a glass container such as a jelly jar or glass, the rim or edge of the glass container presses into the gasket and forms a seal therewith. In order to keep cost to a minimum, the plastisol gasket is made as thin as possible consistent with the normal variations and irregularities of the rims or lips of the low-cost glass containers to be sealed. That is, the gasket material must be thick enough so that the lowest points on the rims of the glass containers will engage and form a seal with the gasket.

Normally, these closure caps are applied to the filled containers so as to form a hermetically sealed package. For example, in one commercial operation carried out by automatic machinery of known type the caps are rapidly placed onto the tops of glass containers which have been previously filled with the desired product and in which the small head space of each filled container is filled with steam. A vacuum is formed by condensing the steam with the closure cap in place and the preliminary seal obtained by contact is perfected and maintained by the vacuum so that considerable force is required to break the vacuum and dislodge the cap. The caps may be provided with a plurality of locking lugs so as to facilitate the replacement and resealability of the caps on the containers after being opened. Thus, after such a cap has been initially removed from a container and a portion of the contents removed, the cap may be re-applied any number of times and a dirt-tight, and even air-tight seal, obtained by coaction of lugs on the cap with lugs on the exterior of the glass container.

The provision of closure caps of this type having flowed-in plastisol gaskets created one problem that had not been previously encountered with similar caps provided with preformed ring gaskets. While many plastisol formulations were available or could be made which had adequate adhesion to the lacquer-lined interiors of the metal shells or cap bodies at room temperatures, difficulty was encountered in obtaining or maintaining adhesion at the elevated temperatures and under the moist conditions encountered when the caps were applied to filled glass containers by the automatic capping machines referred to above wherein vacuum is obtained by condensing steam. This difficulty was accentuated when, because of temporary stoppages during the filling and capping operation, a container or group of containers would be subjected to such elevated temperature and moist heat for longer times than usual. Furthermore, many products require heat sterilization after they have been capped and in such cases the gaskets are again subjected to hot moist heat. For example, sterilization temperatures up to 250° F. for as long as 90 minutes are not uncommon.

It should be noted that the problem of adhering plastisol gaskets to the cap bodies was not merely one of withstanding hot moist heat conditions alone. In fact, plastisol formulations could be obtained which exhibited sufficient adherence, under these conditions, to the lacquer-lined or coated tin plate commonly used for the shells or bodies of closure caps. The problem was to obtain and maintain adherence under such hot moist heat conditions when the caps were also subjected to the usual mechanical forces, torques and pressures encountered in sealing and other manipulations.

It was discovered in accordance with the present invention that while separation of flowed-in plastisol gaskets from the cap bodies could not be entirely prevented, nevertheless, it was possible to solve this problem of adherence in a practical manner by providing the flowed-in plastisol gaskets with thin inner marginal portions tapering to a feather edge and so positioned in the cap bodies that because of their thinness and their location they do not receive or transmit dislodging forces or torques. The nature of this discovery and solution will be more apparent in the light of the following detailed description taken in connection with the accompanying drawings.

The feather-edge principle of the present invention is not only applicable to hot pack applications but also to closure caps which are applied and sealed cold without heat or moisture. In such cases the feather edge provides a sufficient mechanical contact and seal of the thin marginal portion to the cap panel even when the flowed-in compound has practically no ordinary adhesion to the panel, usually lithographed tin plate.

The object of the invention, generally stated, is the provision of closure caps of the class described wherein the flowed-in plastisol gaskets have an inner, integrally formed, thin marginal or border portion tapering to a feather edge which because of its thinness and adherence to a portion of the cap body top panel at a location inwardly from a continuous shoulder therein which forms one side wall of a channel for receiving the main deposit of the flowed-in gasket material, does not receive and/or transmit the dislodging or displacement forces, torques and pressures which act upon the main gasket portion and often result in some separation of the gasket from the cap body.

Certain other objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 1 is a side elevational view of a glass container hermetically sealed with a closure cap which represents one embodiment of the present invention;

Fig. 2 is a top plan view of the closure cap shown in Fig. 1;

Fig. 3 is a bottom plan view of the closure cap shown in Fig. 1 and removed from the glass container;

Fig. 4 is a fragmentary sectional view on enlarged scale taken on line 4—4 of Fig. 2;

Fig. 5 is a view similar to Fig. 4 taken at another location around the periphery of the cap and showing the mouth of the glass container pressed into hermetically sealed engagement with the flowed-in gasket and resulting in the separation of the gasket at two places from the closure cap; and Fig. 6 is a view similar to Fig. 4 illustrating a modification of the invention.

In Fig. 1 a glass container 5, such as an ordinary jelly glass, is sealed with a closure cap 6. This food package illustrates one of the large volume uses of the closure caps forming the subject matter of this invention. The invention pertains to certain specific features of the closure cap which are shown and illustrated in Figs 2–6 of the drawings and to which reference is now made.

The closure cap 6 consists of a cap body or shell having a top panel portion indicated generally at 7 and a depending skirt portion designated at 8. The cap bodies or shells are stamped out from suitably coated tin plate, although other materials could be used. The machinery and methods for stamping out the cap bodies or shells in forming the same are broadly old and do not form a part of the present invention. Generally, the tin plate is enameled on the exterior, and the interior is enameled or coated with a known lacquer formulation so as to form a protective coating on the interior of the cap body or shell and give the interior attractiveness in appearance. In the claims "enamel" is used to mean enamel or lacquer.

The bottom edge of the depending skirt 8 will be rolled as indicated at 10 in Fig. 5 so as to reinforce this edge, give it a neat appearance, and remove the sharp edge which is left when the cap shell or body is stamped out. The cap body may optionally be provided with a plurality of lugs which are indicated at 11—11 in Figs. 3 and 4, depending on the type of glass container it is to be used on. These lugs are for cooperative relationship with lugs integrally formed on the exterior of the glass container and serve to assist in the resealing of the cap 6 on the container for reuse after it has been removed for the first time. The number and shape of the lugs 11, and the formation thereof, do not form part of the present invention.

A continuous annular shoulder 12 is formed in the top panel portion 7 of the cap body and this shoulder constitutes one of the side walls of a continuous gasket-receiving channel which is designated at 13. The opposite and outer side wall of this channel portion is formed by the rounded shoulder 14 which integrally connects the periphery of the top panel portion 7 with the vertical skirt or side wall portion 8. The flowed-in plastisol gasket disposed within the channel 13 is indicated at 15.

The gasket 15 may be formulated from several known plastisol formulations and flowed into the channel 13 when the cap 6 is inverted and spinning. The flowed-in plastisol is fluxed by use of known machinery and methods already in commercial use as mentioned above. However, the gasket 15 does distinguish in an important and critical respect from prior flowed-in plastisol gaskets. This distinctive feature of the gasket resides in a thin marginal or border portion designated at 16 and the particular location thereof with respect to the shoulder 12. It will be seen that this portion 16 is relatively thin in comparison with the main body portion of the gasket 15 and that it tapers to a feather edge at the inner edge thereof as designated at 17. As produced, the gasket 15 is more or less adherent to the interior of the cap body or shell insofar as the same is covered by the gasket material.

When the closure cap 6 is pressed down onto the mouth of the glass container 5 by exteriorly applied pressure and/or internally created vacuum, the top surface of the glass container rim or lip which is referred to as a glass finish, and which is indicated at 18, presses into and deforms the main body of the flowed-in gasket as indicated in Fig. 5. This indenting pressure sets up forces within the main body of the flowed-in gasket which tend to cause it to separate from the floor of the channel 13 on opposite sides of the glass finish 18. If torque is applied to the cap, additional dislodging forces are created. Prolonged exposure to hot moist heat while under such stress overcomes the adherence between the plastisol lining and the lacquer lining of the cap shell or body and permits the flowed-in gasket to separate usually at the locations indicated at A and B (Fig. 5). A number of closure caps of the type shown in the drawings have been sectioned and separation at these locations noted although it will be understood that separation does not necessarily conform to the exact shapes and extent in Fig. 5. In other words, the separation depicted at A and B in Fig. 5 is representative only of the type of separation that can and does occur.

It has been ascertained that there are two factors and reasons why the thin inner border or marginal portion 16 with the feather edge 17 does not separate or lose its adherence to the lacquer-coated surface on the interior of the cap body or shell. One reason or factor is that the marginal portion 16 is so thin that it is not capable of transmitting compression and/or torque forces that may be brought to bear on the main body of the flowed-in gasket. The second reason and factor is that the thin marginal portion 16 is located radially inward of the shoulder 12. It is adjacent the shoulder 12 that the greatest tendency toward separation and separation tends to occur as indicated at A. Evidently there is a maximum concentration of separating force created in the area of the shoulder 12 which is dissipated in the vicinity thereof. However, such forces does not extend inwardly beyond the shoulder 12 to any appreciable distance.

In addition to the foregoing factors, it has been found that the thin section 16 or any comparable border or inner marginal portion should originate at a distance from the inside of the glass finish a distance equal approximately to twice the thickness of the glass finish which presses into the plastisol. Thus, in Fig. 5 it will be noted that the vertical line 20—20 designates approximately the beginning of the thin section 16 and that the distance of this line 20—20 from the inside of the glass container 5 is approximately twice the thickness of the glass finish 18 which presses into the gasket.

Since the thin marginal section 16, and particularly the feather edge 17, remains in continuous contact with the panel at all times, no crevices or minute separations develop between the panel and gasket wherein local concentrations of electrolyte can occur and produce localized corrosion.

In Fig. 6 a modified top panel configuration is shown wherein the central portion of the panel instead of being flat and level starting with the bottom of the shoulder 12, rises through a gradual annular incline 21 to a height which is approximately level with the top of the channel 13. The gasket within this modified form of shell is of the same configuration and has the same characteristics as the gasket in the cap body or shell as shown in Figs. 2–5. This configuration shown in Fig. 6 for the top panel assists in stacking containers having these closure caps applied thereto.

It will be understood that a number of modifications and changes in detail may be made in the closure caps described above and illustrated in the accompanying drawings without departing from the spirit and scope of the invention.

What is claimed as new is:

1. A closure cap of the top seal type for use in establishing and maintaining a hermetic seal on a glass container of the type in which the upper edge only of the rim of the container constitutes the hermetic sealing finish; said cap comprising a cup-shaped shell which is lined with enamel and is characterized by a generally flat top panel portion and a depending skirt portion, and an annular sealing gasket within the outer section only of the shell adjacent the skirt portion of the latter for sealingly embedded engagement with the sealing finish on the upper edge of the rim of the container when the cap is drawn down on the container; the top panel portion of the shell being provided at a point spaced inwardly from the position occupied by the inner edge of the sealing finish on the rim of the container with an abruptly inclined annular shoulder, which shoulder forms the inner wall of a relatively wide and shallow annular channel; said gasket being formed of a vinyl-base plastisol which is adherently compatible with the enamel lining of the shell and which is flowed into said channel and fluxed in place therein, and said gasket having a relatively thick annular deformable finish-engaging portion which fills said channel substantially flush with the inwardly adjoining surface of the top panel portion of the shell, and having an abruptly reduced relatively thin annular film-like anchoring portion, which relatively thin anchoring portion is integrally connected with the relatively thick finish-engaging portion across the shoulder in firmly adherent contact with the top panel portion of the shell throughout an annular zone of appreciable width of the top panel portion, which zone is located between the shoulder and the exposed center section of the shell, the thickness of said annular anchoring portion being but a small fraction of the thickness of said annular finish-engaging portion.

2. The closure cap of claim 1 wherein the width of said annular anchoring portion is at least equal to the thickness of said annular finish-engaging portion.

3. The closure cap of claim 1 wherein the width of said annular anchoring portion is at least equal to the radial width of the inclined portion of said annular shoulder.

References Cited in the file of this patent

UNITED STATES PATENTS

| 1,805,623 | Hammer | May 19, 1931 |
| 2,463,701 | Krueger | Mar. 8, 1949 |
| 2,654,913 | Maier | Oct. 13, 1953 |

FOREIGN PATENTS

| 1,047,061 | France | July 15, 1953 |
| 505,297 | Canada | Aug. 24, 1954 |
| 64,292 | France | June 1, 1955 |